United States Patent
Pellington

(10) Patent No.: US 10,451,525 B2
(45) Date of Patent: Oct. 22, 2019

(54) WHEEL TESTING ASSEMBLY

(71) Applicant: Everton Pellington, Brooklyn, NY (US)

(72) Inventor: Everton Pellington, Brooklyn, NY (US)

( * ) Notice: Subject to any disclaimer, the term of this patent is extended or adjusted under 35 U.S.C. 154(b) by 176 days.

(21) Appl. No.: 15/611,968

(22) Filed: Jun. 2, 2017

(65) Prior Publication Data
US 2018/0348089 A1 Dec. 6, 2018

(51) Int. Cl.
*G01M 17/013* (2006.01)

(52) U.S. Cl.
CPC .................................. *G01M 17/013* (2013.01)

(58) Field of Classification Search
None
See application file for complete search history.

(56) References Cited

U.S. PATENT DOCUMENTS

| | | | |
|---|---|---|---|
| 621,153 A | 3/1899 | Schmidt | |
| 1,480,777 A * | 1/1924 | Meiselbach | B23K 31/02 228/182 |
| 3,956,829 A | 5/1976 | Moxon | |
| 4,000,639 A | 1/1977 | Postema | |
| 5,008,647 A * | 4/1991 | Brunt | G01C 22/002 324/168 |
| 5,156,635 A * | 10/1992 | Snow, Jr. | B21D 1/08 72/110 |
| 5,201,782 A | 4/1993 | Bartlett | |
| 5,243,765 A | 9/1993 | Lynch | |
| 5,539,988 A | 7/1996 | Braun | |

FOREIGN PATENT DOCUMENTS

CN 203705103 U * 7/2014

* cited by examiner

*Primary Examiner* — Andre J Allen

(57) ABSTRACT

A wheel testing assembly for testing a wheel on a bicycle for a bend includes a clamping unit that is selectively attached to a frame of a bicycle. Moreover, the clamping unit is aligned with a wheel on the bicycle. A gauge is removably coupled to the clamping unit and the gauge is aligned with the wheel. The gauge has a distal end with respect to the clamping unit. The distal end frictionally engages the wheel at a point where the wheel is bent. In this way a roundness of the wheel is tested.

16 Claims, 5 Drawing Sheets

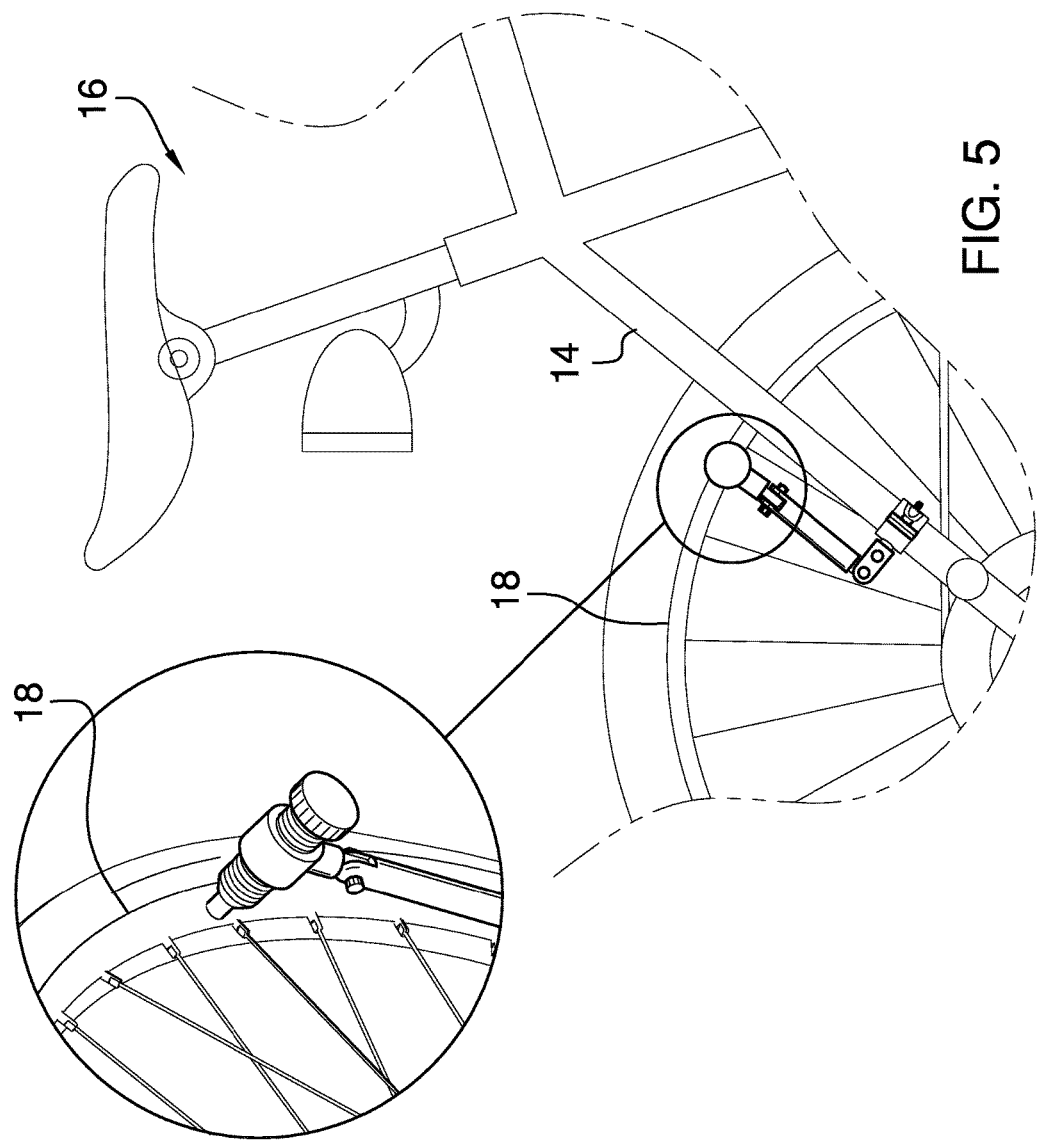

WHEEL TESTING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art Including Information Disclosed under 37 CFR 1.97 and 1.98.

The disclosure and prior art relates to testing devices and more particularly pertains to a new testing device for testing a wheel on a bicycle for a bend.

BRIEF SUMMARY OF THE INVENTION

An embodiment of the disclosure meets the needs presented above by generally comprising a clamping unit that is selectively attached to a frame of a bicycle. Moreover, the clamping unit is aligned with a wheel on the bicycle. A gauge is removably coupled to the clamping unit and the gauge is aligned with the wheel. The gauge has a distal end with respect to the clamping unit. The distal end frictionally engages the wheel at a point where the wheel is bent. In this way a roundness of the wheel is tested.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 5 is a perspective in-use view of an embodiment of the disclosure.

DETAILED DESCRIPTION OF THE INVENTION

Figure 1:
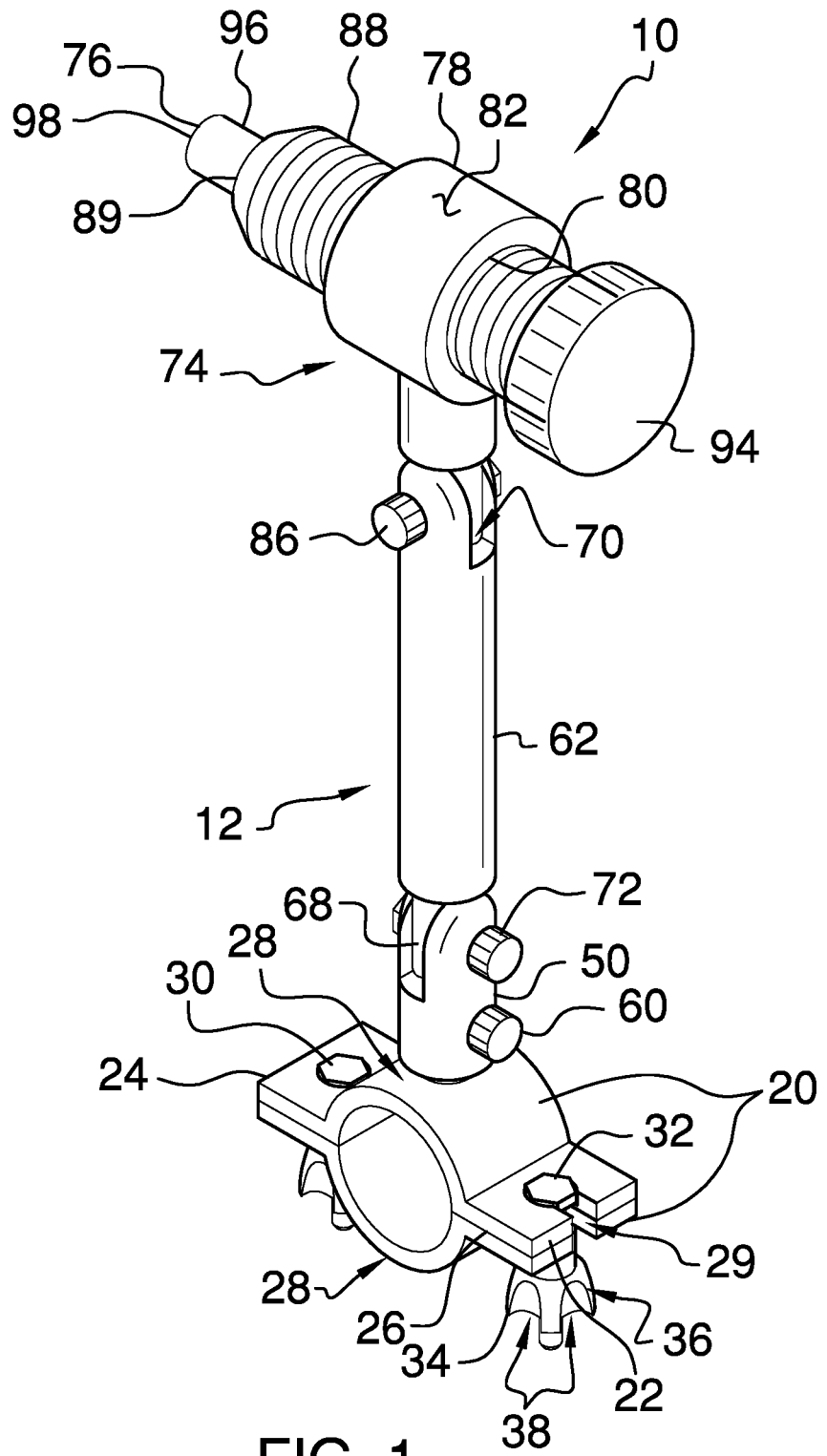
FIG. 1 is a perspective view of a wheel testing assembly according to an embodiment of the disclosure.
Figure 2:
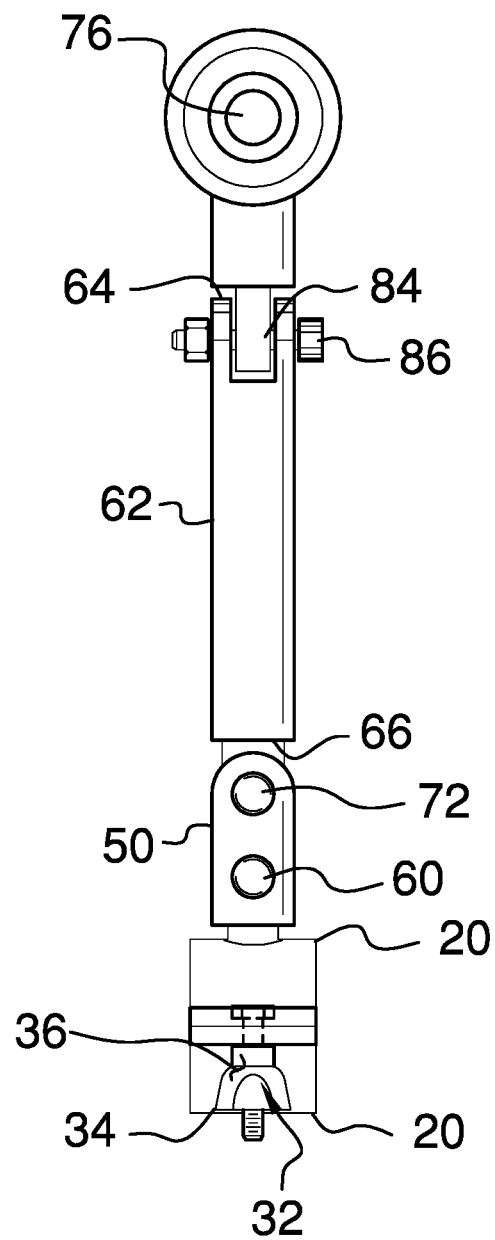
FIG. 2 is a front view of an embodiment of the disclosure.
Figure 3:
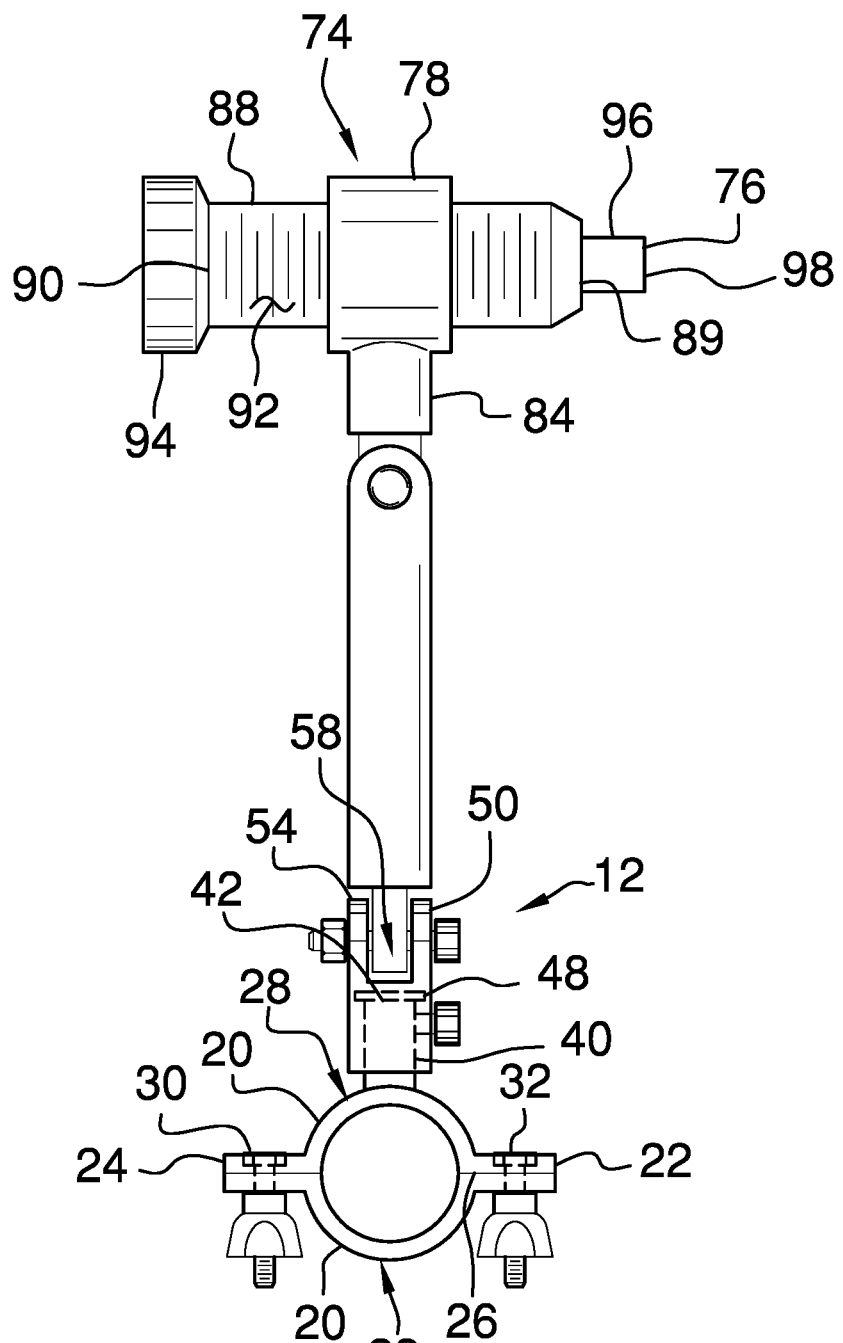
FIG. 3 is a right side view of an embodiment of the disclosure.
Figure 4:
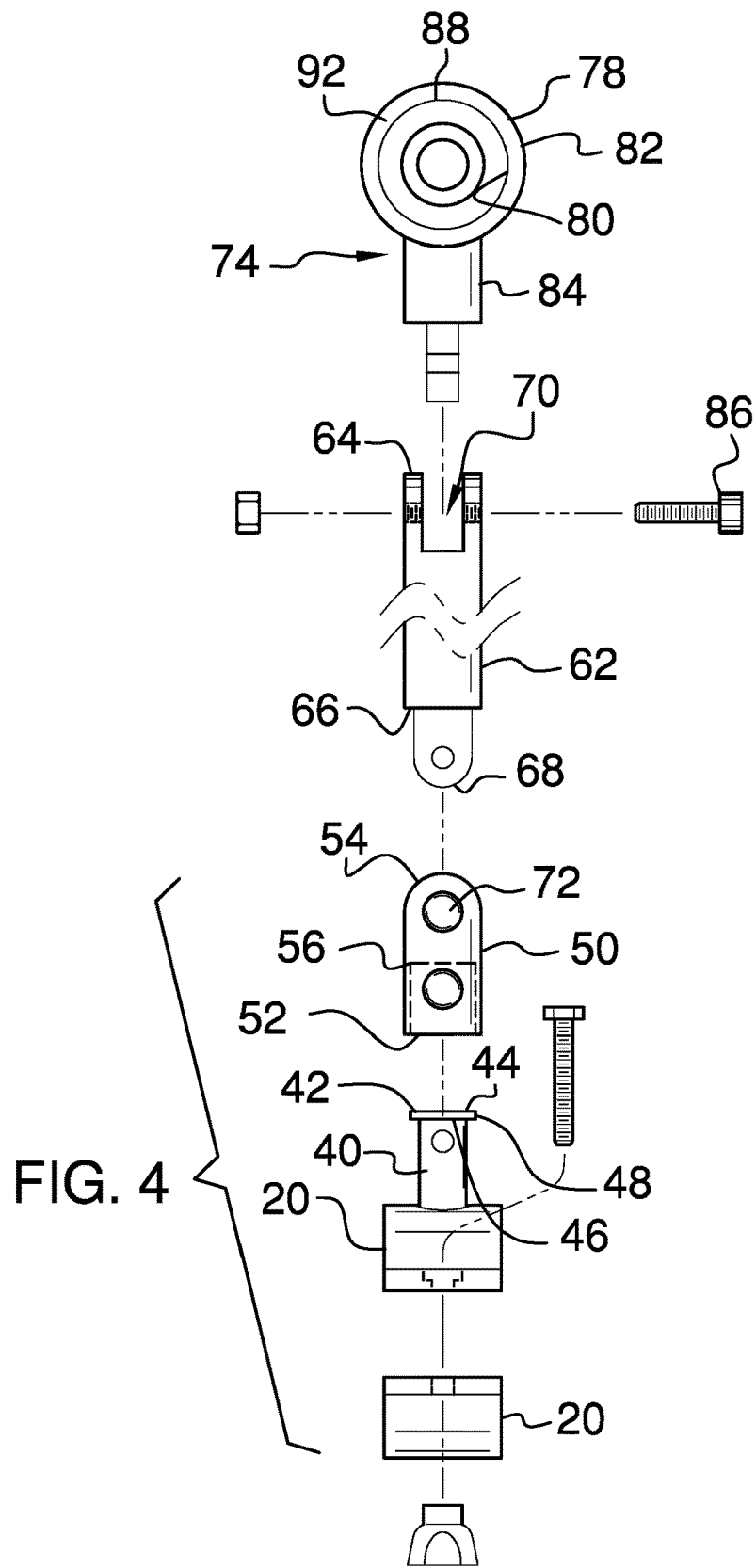
FIG. 4 is an exploded perspective view of an embodiment of the disclosure.

With reference now to the drawings, and in particular to FIGS. 1 through 5 thereof, a new testing device embodying the principles and concepts of an embodiment of the disclosure and generally designated by the reference numeral 10 will be described.

As best illustrated in FIGS. 1 through 5, the wheel testing assembly 10 generally comprises a clamping unit 12 that is selectively attached to a frame 14 of a bicycle 16. The clamping unit 12 is positioned to be aligned with a wheel 18 on the bicycle 16. The wheel 18 may be a front wheel and a rear wheel on the bicycle 16. Additionally, the bicycle 16 may be a bicycle 16 of any conventional design.

The clamping unit 12 comprises a pair of straps 20 that each has a first end 22, a second end 24 and a first surface 26. Each of the straps 20 has an arcuate portion 28 extending substantially between the first end 22 and the second end 24. The arcuate portion 28 corresponding to each of the straps 20 is concavely arcuate with respect to the first surface 26. The first end 22 corresponding to each of the straps 20 has a first slot 29 extending toward the arcuate portion 28.

Each of the straps 20 is positioned on each other having the first surface 26 corresponding to each of the straps 20 abutting each other. In this way the arcuate portion 28 corresponding to each of the straps 20 is aligned to form a circle. Each of the straps 20 is positioned on the frame 14 of the bicycle 16 having the arcuate portion 28 corresponding to each of the straps 20 surrounding the frame 14. The straps 20 may be positioned on a chain stay of the bicycle 16 and a front fork of the bicycle 16.

A first fastener 30 extends through each of the straps 20 and the first fastener 30 is positioned between the second end 24 and the arcuate portion 28. The first fastener 30 is selectively tightened to retain the straps 20 on the bicycle 16. A second fastener 32 is selectively inserted into the first slot 29. The second fastener 32 is selectively tightened to retain the straps 20 on the bicycle 16. Each of the first 30 and second 32 fasteners may include a nut and a bolt. The nut 34 corresponding to each of the first 30 and second 32 fasteners may have a peripheral surface 36 and the peripheral surface 36 corresponding to each of the nuts may have a plurality of indentations 38. The indentations 38 on each of the nuts 34 may be spaced apart from each other and be distributed around the corresponding nut. The indentations 38 on each of the nuts 34 enhance gripping each of the nuts 34.

A peg 40 is coupled to and extends away from the first surface 26 of an associated one of the straps 20 and the peg 40 has a distal end 42 with respect to the associated strap 20. A disk 44 is provided that has a primary surface 46. The primary surface 46 is coupled to the distal end 76 of the peg 40 having a perimeter edge 48 of the disk 44 extending beyond the peg 40. A receiver 50 is provided that has a bottom end 52 and a top end 54. The bottom end 52 has a well 56 extending toward the top end 54 and the top end 54 has a second slot 58 extending toward the bottom end 52. The well 56 insertably receives the peg 40 such that the receiver 50 is rotatable about a vertical axis extending through the top 54 and bottom 52 ends.

A third fastener 60 is extended through the receiver 50 and engages the peg 40. In this way the receiver 50 is retained at a selected orientation on the peg 40. The third fastener 60 frictionally engages the primary surface 46 of the disk 44 such that the receiver 50 is inhibited from is removed from the peg 40. The third fastener 60 may be a set screw or the like.

A rod 62 is provided that has an upper end 64 and a lower end 66 and the rod 62 is elongated between the upper 64 and lower 66 ends. The lower end 66 has a first tab 68 extending downwardly therefrom and the upper end 64 has a third slot 70 extending toward the lower end 66. The first tab 68 is positioned in the second slot 58. A fourth fastener 72 is extended through the receiver 50 and engages the first tab 68 on the rod 62 such that the rod 62 is pivotally coupled to the receiver 50. The rod 62 is positioned at a selected angle with respect to the vertical axis in the receiver 50. Moreover, the fourth fastener 72 is selectively tightened to retain the rod 62 at the selected angle. The fourth fastener 72 may comprise a nut and a bolt.

A gauge 74 is provided and the gauge 74 is removably coupled to the clamping unit 12. In this way the gauge 74 is positioned to be aligned with the wheel 18. The gauge 74 has a distal end 76 with respect to the clamping unit 12. The distal end 76 frictionally engages the wheel 18 at a point where the wheel 18 is bent when the wheel 18 spin 96s. In this way a roundness of the wheel 18 is tested.

The gauge 74 comprises a collar 78 that has an inwardly facing surface 80 and an outwardly facing surface 82. A second tab 84 is coupled to and extends away from the outwardly facing surface 82 and the second tab 84 is positioned in the third slot 70 in the rod 62. A fifth fastener 86 is extended through the rod 62 and engages the second tab 84. In this way the collar 78 is pivotally coupled to the rod 62. The collar 78 is positioned at a selected angle with respect to a vertical axis extending through the upper 64 and lower 66 ends of the rod 62. The fifth fastener 86 is selectively tightened to retain the collar 78 at the selected angle and the fifth fastener 86 may comprise a nut and a bolt.

A cylinder 88 is provided that has a first end 89, a second end 90 and an outer surface 92 extending therebetween. The outer surface 92 is threaded between the first end 89 and the second end 90 of the cylinder 88. The cylinder 88 is positioned in the collar 78 having the outer surface 92 threadably engaging the inwardly facing surface 80 of the collar 78. In this way the cylinder 88 is movably attached to the collar 78 having the cylinder 88 being positioned at a selected angle with the vertical axis in the rod 62.

A knob 94 is provided and the knob 94 is coupled to the second end 90 of the cylinder 88. The knob 94 rotates the cylinder 88 when the knob 94 is manipulated thereby urging the first end 22 of the cylinder 88 to be spaced a selected distance from the collar 78. A pin 96 is coupled to and extends away from the first end 22 of the cylinder 88. The pin 96 has a distal end 98 with respect to the first end 22 of the cylinder 88 and the pin 96 is spaced a selected distance from the wheel 18 when the knob 94 is rotated. The distal end 98 of the pin 96 selectively frictionally engages the wheel 18 when the wheel 18 rotates thereby facilitating a bend in the wheel 18 to be located.

In use, the clamping unit 12 is attached to the frame 14 of the bicycle 16 to facilitate the cylinder 88 to be aligned with an outwardly facing surface of the selected wheel 18. The knob 94 is rotated to space the distal end 76 of the pin 96 a selected distance from the outwardly facing surface of the selected wheel 18. The distal end 76 of the pin 96 frictionally engages the outwardly facing surface 82 of the selected wheel 18 when the wheel 18 rotates and the wheel 18 is bent. In this way the location of the bend on the wheel 18 is located without removing the wheel 18 from the bicycle 16. The clamping unit 12 is removable from the bicycle 16 at any selected time.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A wheel testing assembly being configured to test a wheel for bends, said assembly comprising:
   a clamping unit being configured to be selectively attached to a frame of a bicycle thereby facilitating said clamping unit to be aligned with a wheel on the bicycle; and
   a gauge being removably coupled to said clamping unit wherein said gauge is configured to be aligned with the wheel, said gauge having a distal end with respect to said clamping unit wherein said distal end is configured to frictionally engage the wheel at a point where the wheel is bent thereby facilitating a roundness of the wheel to be tested.

2. The assembly according to claim 1, wherein said clamping unit comprises a pair of straps, each of said straps having a first end, a second end and a first surface, each of said straps having an arcuate portion extending between said first end and said second end, said arcuate portion corresponding to each of said straps being concavely arcuate with respect to said first surface, said first end corresponding to each of said straps having a first slot extending toward said arcuate portion.

3. The assembly according to claim 2, wherein each of said straps is positioned on each other having said first surface corresponding to each of said straps abutting each other and having said arcuate portion corresponding to each of said straps being aligned to form a circle wherein each of said straps is configured to be positioned on a frame of a the bicycle having said arcuate portion corresponding to each of said straps surrounding the frame.

4. The assembly according to claim 2, further comprising a first fastener extending through said of said straps, said first fastener being positioned between said second end and said arcuate portion, said first fastener being selectively tightened wherein said first fastener is configured to retain said straps on the bicycle.

5. The assembly according to claim 2, further comprising a second fastener being selectively inserted into said first slot, said second fastener being selectively tightened wherein said second fastener is configured to retain said straps on the bicycle.

6. The assembly according to claim 2, further comprising:
   a peg being coupled to and extending away from said first surface of an associated one of said straps, said peg having a distal end with respect to said associated strap; and
   a disk having a primary surface, said primary surface being coupled to said distal end of said peg having a perimeter edge of said disk extending beyond said peg.

7. The assembly according to claim 1, further comprising a receiver having a bottom end and a top end, said bottom end having a well extending toward said top end, said top end having a second slot extending toward said bottom end, said well insertably receiving said peg such that said receiver is rotatable about a vertical axis extending through said top and bottom ends.

8. The assembly according to claim 7, further comprising a rod having an upper end and a lower end, said rod being elongated between said upper and lower ends, said lower end having a first tab extending downwardly therefrom, said upper end having a third slot extending toward said lower end, said first tab being positioned in said second slot.

9. The assembly according to claim 5, further comprising a fourth fastener being extended through said receiver and engaging said first tab on said rod such that said rod is pivotally coupled to said receiver, said rod being positioned at a selected angle with respect to said vertical axis in said receiver, said fourth fastener being selectively tightened to retain said rod at said selected angle.

10. The assembly according to claim 1, wherein said gauge comprises a collar having an inwardly facing surface and an outwardly facing surface.

11. The assembly according to claim 10, further comprising:
    a rod having an upper end, a lower end and a third slot; and
    a second tab being coupled to and extending away from said outwardly facing surface, said second tab being positioned in said third slot in said rod.

12. The assembly according to claim 11, further comprising a fifth fastener being extended through said rod and engaging said second tab such that said collar is pivotally coupled to said rod, said coupler being positioned at a selected angle with respect to a vertical axis extending through said upper and lower ends of said rod, said fifth fastener being selectively tightened to retain said collar at said selected angle.

13. The assembly according to claim 10, further comprising a cylinder having a first end, a second end and an outer surface extending therebetween, said outer surface being threaded between said first end and said second end of said cylinder, said cylinder being positioned in said collar having said outer surface threadably engaging said inwardly facing surface of said collar such that said cylinder is movably attached to said collar.

14. The assembly according to claim 13, further comprising a knob being coupled to said second end of said cylinder wherein said knob is configured to be manipulated, said knob urging said first end of said cylinder to be spaced a selected distance from said collar.

15. The assembly according to claim 13, further comprising a pin being coupled to and extending away from said first end of said cylinder, said pin having a distal end with respect to said first end of said cylinder, said pin being configured to be spaced a selected distance from the wheel when said knob is rotated, said distal end of said pin being configured to selectively frictionally engage the wheel when the wheel rotates thereby facilitating a bend in the wheel to be located.

16. A wheel testing assembly being configured to test a wheel for bends, said assembly comprising:
    a clamping unit being configured to be selectively attached to a frame of a bicycle thereby facilitating said clamping unit to be aligned with a wheel on the bicycle, said clamping unit comprising:
    a pair of straps, each of said straps having a first end, a second end and a first surface, each of said straps having an arcuate portion extending between said first end and said second end, said arcuate portion corresponding to each of said straps being concavely arcuate with respect to said first surface, said first end corresponding to each of said straps having a first slot extending toward said arcuate portion, each of said straps being positioned on each other having said first surface corresponding to each of said straps abutting each other and having said arcuate portion corresponding to each of said straps being aligned to form a circle wherein each of said straps is configured to be positioned on a frame of a the bicycle having said arcuate portion corresponding to each of said straps surrounding the frame,
    a first fastener extending through said of said straps, said first fastener being positioned between said second end and said arcuate portion, said first fastener being selectively tightened wherein said first fastener is configured to retain said straps on the bicycle,
    a second fastener being selectively inserted into said first slot, said second fastener being selectively tightened wherein said second fastener is configured to retain said straps on the bicycle,
    a peg being coupled to and extending away from said first surface of an associated one of said straps, said peg having a distal end with respect to said associated strap,
    a disk having a primary surface, said primary surface being coupled to said distal end of said peg having a perimeter edge of said disk extending beyond said peg,
    a receiver having a bottom end and a top end, said bottom end having a well extending toward said top end, said top end having a second slot extending toward said bottom end, said well insertably receiving said peg such that said receiver is rotatable about a vertical axis extending through said top and bottom ends,
    a third fastener being extended through said receiver and engaging said peg such that said receiver is retained at a selected orientation on said peg, said third fastener abutting said primary surface of said disk such that said receiver is inhibited from being removed from said peg,
    a rod having an upper end and a lower end, said rod being elongated between said upper and lower ends, said lower end having a first tab extending downwardly therefrom, said upper end having a third slot extending toward said lower end, said first tab being positioned in said second slot, a fourth fastener being extended through said receiver and engaging said first tab on said rod such that said rod is pivotally coupled to said receiver, said rod being positioned at a selected angle with respect to said vertical axis in said receiver, said fourth fastener being selectively tightened to retain said rod at said selected angle; and a gauge being removably coupled to said clamping unit wherein said gauge is configured to be aligned with the wheel, said gauge having a distal end with respect to said clamping unit wherein said distal end is configured to frictionally engage the wheel at a point where the wheel is bent thereby facilitating a roundness of the wheel to be tested, said gauge comprising:

a collar having an inwardly facing surface and an outwardly facing surface, a second tab being coupled to and extending away from said outwardly facing surface, said second tab being positioned in said third slot in said rod, a fifth fastener being extended through said rod and engaging said second tab such that said collar is pivotally coupled to said rod, said coupler being positioned at a selected angle with respect to a vertical axis extending through said upper and lower ends of said rod, said fifth fastener being selectively tightened to retain said collar at said selected angle, a cylinder having a first end, a second end and an outer surface extending therebetween, said outer surface being threaded between said first end and said second end of said cylinder, said cylinder being positioned in said collar having said outer surface threadably engaging said inwardly facing surface of said collar such that said cylinder is movably attached to said collar, a knob being coupled to said second end of said cylinder wherein said knob is configured to be manipulated, said knob urging said first end of said cylinder to be spaced a selected distance from said collar, and a pin being coupled to and extending away from said first end of said cylinder, said pin having a distal end with respect to said first end of said cylinder, said pin being configured to be spaced a selected distance from the wheel when said knob is rotated, said distal end of said pin being configured to selectively frictionally engage the wheel when the wheel rotates thereby facilitating a bend in the wheel to be located.

* * * * *